(12) United States Patent
Grein et al.

(10) Patent No.: US 8,822,021 B2
(45) Date of Patent: Sep. 2, 2014

(54) PROCESS FOR THE PRODUCTION OF PROPYLENE RANDOM COPOLYMERS FOR INJECTION MOULDING APPLICATIONS

(75) Inventors: Christelle Grein, Linz (AT); Klaus Bernreitner, Linz (AT); Mari Kylmälä, Puchenau (AT); Balakantha rao Kona, Linz (AT); Elisabeth Potter, Linz (AT)

(73) Assignee: Borealis AG, Vienna (AT)

( * ) Notice: Subject to any disclaimer, the term of this patent is extended or adjusted under 35 U.S.C. 154(b) by 13 days.

(21) Appl. No.: 13/138,489

(22) PCT Filed: Mar. 1, 2010

(86) PCT No.: PCT/EP2010/052517
§ 371 (c)(1),
(2), (4) Date: Nov. 9, 2011

(87) PCT Pub. No.: WO2010/100098
PCT Pub. Date: Sep. 10, 2010

(65) Prior Publication Data
US 2012/0088086 A1 Apr. 12, 2012

(30) Foreign Application Priority Data

Mar. 2, 2009 (EP) .................................... 09154080
Jul. 3, 2009 (EP) .................................... 09164502

(51) Int. Cl.
C08F 4/42 (2006.01)
C08F 2/12 (2006.01)
C08F 210/06 (2006.01)
C08F 2/00 (2006.01)
C08F 2/34 (2006.01)
C08F 210/16 (2006.01)

(52) U.S. Cl.
CPC ............. *C08F 210/16* (2013.01); *C08F 210/06* (2013.01)
USPC ............. 428/220; 526/126; 526/128; 526/65; 502/155; 502/152

(58) Field of Classification Search
USPC .......................................................... 526/128
See application file for complete search history.

(56) References Cited

U.S. PATENT DOCUMENTS

2002/0137860 A1 9/2002 Collina et al.
2006/0217502 A1* 9/2006 Migone et al. .................. 526/65

FOREIGN PATENT DOCUMENTS

| EP | 0341723 A2 | 5/1989 |
|---|---|---|
| EP | 0426139 A2 | 5/1991 |
| EP | 0491566 A2 | 6/1992 |
| EP | 0887379 A1 | 12/1998 |
| EP | 1538167 A1 | 6/2005 |
| EP | 1783145 A1 | 5/2007 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9822514 A1 | 5/1998 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2006082144 A1 | 8/2006 |
| WO | 2007122239 A1 | 11/2007 |
| WO | 2008142130 A1 | 11/2008 |
| WO | 2009129873 A1 | 10/2009 |

OTHER PUBLICATIONS

International Search Report for Application No. PCT/EP2010/052517 Completed on May 27, 2010.

* cited by examiner

*Primary Examiner* — Ling Choi
*Assistant Examiner* — Catherine S Branch
(74) *Attorney, Agent, or Firm* — Warn Partners, P.C.

(57) ABSTRACT

Process for the production of polypropylene random copolymers containing 2.5 to 5.0 wt % of ethylene as comonomer and having an $MFR_2$ in accordance with ISO 1 133 (230° C., 2.16 kg load) of ≥25 g/10 min to 100 g/10 min and a hexane-solubles content, determined according to FDA CFR 21 §177.1520 below 5 wt %, said process comprising the step of polymerizing propylene and ethylene in the presence of a catalyst system comprising (i) a Ziegler-Natta procatalyst which contains a trans-esterification product of a lower alcohol and a phthalic ester as internal donor and (ii) an organometallic cocatalyst and (iii) an external donor represented by formula (I) or (II) $Si(OCH_2CH_3)_3(NR^1R^2)$ (I) or $Si(OCH_3)_2(CH_3(cyclohexyl))$ (II) wherein $R^1$ and $R^2$ can be the same or different and represent a hydrocarbon group having 1 to 12 carbon atoms, the polypropylene random copolymers with a low level of odor and taste themselves and their use for injection molding applications, preferably for thin-wall packaging for food packaging in non-cooking applications and for medical packaging.

6 Claims, No Drawings

PROCESS FOR THE PRODUCTION OF PROPYLENE RANDOM COPOLYMERS FOR INJECTION MOULDING APPLICATIONS

This application is a National Stage of International Application No. PCT/EP2010/052517, filed Mar. 1, 2010. This application claims priority to European Patent Application No. 09154080.7, filed on Mar. 2, 2009 and European Patent Application No. 09164502.8, filed on Jul. 3, 2009. The disclosures of the above applications are incorporated herein by reference.

The present invention relates to a process for the production of polypropylene random copolymers with high melt flow, low odour and taste levels and increased stiffness, which are suitable for injection moulding applications, preferably for thin-walled packaging. Furthermore, the present invention relates to the random copolymers themselves, as well as to their use.

Polypropylene has become one of the most widely used polymers due to its good combination of properties. In particular, polypropylene has become widely used in the field of thin-walled injection moulding applications, where it is used alone or in the form of blends with other resins to produce injection-moulded articles on account of its superior mechanical properties, mouldability, and appearance.

Advantageously, polypropylenes of high fluidity, i.e. of a melt flow index higher than 25 g/10 min in accordance with ISO 1133 (230° C., 2.16 kg load), are employed for the production of articles with very thin walls, high flow length/thickness ratios and complex geometries. Melt flow provides an indication of the polymer resin's processability, such as in extrusion or moulding, where it is necessary to soften or melt the polymer resin. Polymer resins produced with a low melt flow may need to be further modified after their initial polymerization to improve their processability. This is typically done through controlled rheology (CR) techniques wherein the molecular weight of the polymer is lowered, usually by the addition of peroxides, to thereby improve its flowability. This secondary processing, however, adds additional processing steps and increases the cost of manufacturing. Controlled rheology processing may also degrade the polymer and leave peroxide residues so that its use may be limited in certain applications such as food packaging.

Unfortunately, moulded articles produced from such polypropylenes, prepared by CR techniques, have a characteristic odour which poses a serious problem when they are applied to food packaging containers and bags and food storage containers, as in these CR techniques peroxides are generally used to get the flowability on a desired level. This odour has an adverse effect on the flavour of foods and deteriorates the value of foods and diminishes the appetite.

Furthermore up to now processing of polypropylene by, e.g., injection moulding, thermoforming or blow moulding, to form thin-walled containers often has resulted in products having insufficient stiffness.

Therefore, there has been a strong demand in further improving the properties of propylene polymers, particularly in improving the properties and processability, and for the reduction of odour and taste.

According to the state of the art several proposals have already been made to solve the above described problems.

EP 1 538 167, for example, describes i.a. the alpha-olefin propylene copolymerization using a catalyst system which comprises the following components (A), (B) and (C):
Component (A): a solid component (i) containing magnesium, titanium, halogen and an internal donor,
Component (B): an organometallic compound and
Component (C): an organosilicon compound represented by the formula

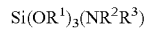

wherein $R^1$ is a hydrocarbon group having 1 to 6 carbon atoms, $R^2$ is a hydrocarbon group having 1 to 12 carbon atoms or hydrogen atom, and $R^3$ is a hydrocarbon group having 1 to 12 carbon atoms and optionally Compound (D): a further organosilicon compound different from Component (C).

Component (A) may be prepared for example by co-grinding a magnesium compound, an electron donor and a titanium halide compound, or by dispersing and dissolving them in a solvent to allow them to contact each other. A further method mentioned comprises dissolving a magnesium compound and an electron donor in a solvent and adding a titanium halide compound to the resulting solution to precipitate a solid catalyst.

According to EP 1 538 167 this catalyst system allows production of an alpha-olefin polymer, like polypropylene random copolymers, with high hydrogen response, high polymerization rate, high stereoregularity and good melt fluidity. The polymers produced can provide excellent performance to automobile and household electric structural materials.

There is no description of polypropylene random copolymers suitable for injection moulding applications like thin-walled packaging, especially for food packaging in non-cooking applications.

EP 1 783 145 discloses a method for producing i.a. a polypropylene random copolymer using a catalyst system which comprises the following components (A), (B) and (C):
Component (A): a prepolymer obtained by olefin prepolymerization on solid titanium catalyst component (A'), prepared by contacting a solid component (i) containing magnesium, titanium, halogen and an donor ($c_3$), a polar compound (ii) having a dipole moment of 0.5 to 4.0 Debye, and at least one compound (iii) selected from liquid titanium (d) and an electron donor (e)
Component (B): an organometallic compound and
Component (C): an organosilicon compound represented by the formula

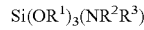

wherein $R^1$ is a hydrocarbon group having 1 to 8 carbon atoms, $R^2$ is a hydrocarbon group having 1 to 12 carbon atoms or hydrogen atom, and $R^3$ is a hydrocarbon group having 1 to 12 carbon atoms.

The propylene copolymer compositions, for example polypropylene random copolymers, obtained according to EP 1 783 145 can be processed into a desired moulded article such as for automotive components. The only advantage mentioned in EP 1 783 145 is that olefinic polymers having high fluidity as well as high stereoregularity even without excessive use of hydrogen molecule as chain transfer agent can be effectively manufactured.

No further advantageous properties of the obtained polymer compositions are mentioned and there is no description of polypropylene random copolymers suitable for injection moulding applications like thin-walled packaging, especially for food packaging in non-cooking applications.

A disadvantage of the method disclosed in EP 1 783 145 is the catalyst system used, especially the complex preparation of the solid titanium catalyst component (A').

None of these documents mentions the production of polypropylene random copolymers suitable for injection moulding applications, preferably for thin-walled packaging, which show improved high purity, respectively reduced odour and taste levels, and increased stiffness compared to products known from the prior art.

The trend in industry is towards polymer materials with higher melt flow rates (MFR), as mentioned before. Higher MFR means better processability of the polymer material, i.e. due to good flowability. Thus faster throughput of the process lines for producing end application articles from the polymer, and therefore cost savings, can be achieved.

But as it is well known in the art a higher MFR means a higher content of the low molecular weight (LMW) component of the polymer. The LMW tail of the polymer composition comprises i.a. lower average molecular weight chains that are more easily soluble. A too high soluble content is detrimental for most final applications and can even yield polymers that do not conform with specific regulations as for example food contact applications. Furthermore, if the solubles are not controlled, polypropylene powder may stick in the polymerization reactor or in the transfer lines.

Unfortunately polypropylene having a high MFR (>25 g/10 min), respectively low molecular weight, is an intrinsically very brittle material. In order to improve its toughness it is known to add high amounts of impact modifier. This in turn has an adverse effect on flow, stiffness and hexane extractables (hexane-solubles).

Impact/stiffness balance along with compliancy to food regulations in terms of hexane-solubles (standard issued by the food drug administration (FDA): hexane solubles <5.5 wt % for food contact in non cooking applications) and low levels of odour and taste are a must in advanced packaging applications.

In order to produce polypropylene random copolymers with high melt flow and low odour, which are suitable for thin-walled injection moulding applications, WO 2007/122239 suggests to use a Ziegler-Natta catalyst comprising a titanium compound having at least one titanium-halogen bond, and a diether compound as internal electron donor, both supported on a magnesium halide in active form, an organoaluminium compound and an external electron donor, which is preferably selected from (tert-butyl)$_2$Si(OCH$_3$)$_2$, (cyclohexyl)(methyl)-Si(OCH$_3$)$_2$, (phenyl)$_2$Si(OCH$_3$)$_2$ and (cyclopentyl)$_2$Si(OCH$_3$)$_2$.

As is stated in the description it is essential that the internal donor of the Ziegler-Natta catalyst is a diether, since phthalates being most widely used as internal donor do not allow the direct production of polypropylenes with high melt flows, i.e. from 40 to 150 g/10 min, without at least significant production penalties. According to WO 2007/122239 such high melt flows for polypropylenes produced by using phthalates as internal donor can only be achieved with an alternative route by controlled rheology (CR) techniques, like visbreaking.

But as is generally known in the state of the art, catalysts containing diethers as internal donor lead to products with quite low stiffness.

For these reasons, although much development work has been done in the field of polypropylene random copolymer-based resins, there is a continuous need for alternative or improved polypropylene random copolymer-based resins, which fulfil the increasing environmental and customer requirements, especially having low odour level, high stiffness, high transparency and good flowability, thus being suitable in injection moulding applications, like thin-wall packaging applications, especially for the production of food packaging.

These polypropylene random copolymers shall show desirable properties, such as improved high purity, respectively reduced odour and taste level, while keeping the other properties needed for the production of moulded articles, like good stiffness/impact ratio together with good flowability. These properties shall be achieved without any subsequent further treatment of the polymers for increasing the melt flow and reducing the odour and taste level.

It was therefore an object of the invention to provide polypropylene random copolymers with high melt flow, reduced low odour and taste levels and increased stiffness, which are suitable for injection moulding applications, preferably for thin-walled packaging.

The present invention resides in the finding that such polypropylene random copolymers are obtainable by a polymerization procedure in the presence of a special Ziegler-Natta procatalyst which contains a trans-esterification product of a lower alcohol and a phthalic ester as internal donor in combination with a special external donor.

Thus in a first aspect, the present invention is therefore directed to a process for the production of polypropylene random copolymers containing 2.5 to 5.0 wt % of ethylene as comonomer and having an MFR$_2$ in accordance with ISO 1133 (230° C., 2.16 kg load) of ≥25 g/10 min to 100 g/10 min and a hexane-solubles content, determined according to FDA CFR 21 §177.1520 below 5.0 wt %, said process comprises the step of polymerizing propylene and ethylene in the presence of a catalyst system comprising (i) a Ziegler-Natta procatalyst which contains a trans-esterification product of a lower alcohol and a phthalic ester as internal donor and (ii) an organometallic cocatalyst and (iii) an external donor represented by formula (I) or (II)

$$Si(OCH_2CH_3)_3(NR^1R^2) \quad (I)$$

or

$$Si(OCH_3)_2(CH_3)(cyclohexyl) \quad (II)$$

wherein R$^1$ and R$^2$ can be the same or different and represent a hydrocarbon group having 1 to 12 carbon atoms.

According to the invention the polypropylene random copolymers are obtained by a polymerization process in the presence of a catalyst system comprising as component (i) a Ziegler-Natta procatalyst which contains a trans-esterification product of a lower alcohol and a phthalic ester as internal donor, (ii) an organometallic cocatalyst and (iii) an external donor represented by formula (I) or (II)

$$Si(OCH_2CH_3)_3(NR^1R^2) \quad (I)$$

or

$$Si(OCH_3)_2(CH_3)(cyclohexyl) \quad (II)$$

wherein R$^1$ and R$^2$ can be the same or different and represent a hydrocarbon group having 1 to 12 carbon atoms.

The procatalyst (i) used according to the invention is prepared by a) reacting a spray crystallized or emulsion solidified adduct of MgCl$_2$ and a C$_1$-C$_2$-alcohol with TiCl$_4$ b) reacting the product of stage a) with a dialkylphthalate of formula (III)

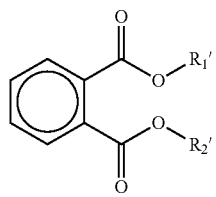

(III)

wherein $R_1'$ and $R_2'$ are independently at least a $C_5$-alkyl, under conditions where a transesterification between said $C_1$-$C_2$-alcohol and said dialkylphthalate of formula (III) takes place to form the internal donor,
c) washing the product of stage b) and
d) optionally reacting the product of step c) with additional TiCl$_4$.

The procatalyst is produced as defined for example in the patent applications WO 87/07620, WO 92/19653, WO 92/19658 and EP 0 491 566. The content of these documents is herein included by reference.

First an adduct of MgCl$_2$ and a $C_1$-$C_2$-alcohol of the formula MgCl$_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl and n is 1 to 6, is contacted with TiCl$_4$ to form a titanised carrier, followed by the steps of
adding to said titanised carrier
(i) a dialkylphthalate of formula (III) with $R_1'$ and $R_2'$ being independently at least a $C_5$-alkyl, like at least a $C_8$-alkyl,
or preferably
(ii) a dialkylphthalate of formula (III) with $R_1'$ and $R_2'$ being the same and being at least a $C_5$-alkyl, like at least a $C_8$-alkyl
or more preferably
(iii) a dialkylphthalate of formula (III) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (III) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature between 100 to 150° C., such that said methanol or ethanol is transesterified with said ester groups of said dialkylphthalate of formula (III) to form preferably at least 80 mol-%, more preferably at least 90 mol-%, most preferably at least 95 mol-%, of a dialkylphthalate of formula (IV)

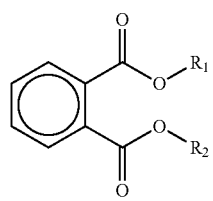

(IV)

with $R_1$ and $R_2$ being methyl or ethyl, preferably ethyl, the dialkylphthalate of formula (IV) being the internal donor and recovering said transesterification product as the procatalyst composition.

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

The transesterification is performed at a temperature above 100° C., advantageously between 130 to 150° C.

As the catalyst residue is removed by extracting, an adduct of the titanised carrier and the internal donor is obtained, in which the group deriving from the ester alcohol has changed.

In case a sufficient amount of titanium remains on the carrier, it will act as an active element of the procatalyst.

Otherwise the titanisation is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and dioctylphthalate (DOP) as dialkylphthalate of formula (III), yielding diethyl phthalate (DEP) as the internal donor compound.

Still more preferably the procatalyst used according to the invention is a catalyst prepared according to WO92/19653; especially with the use of dioctylphthalate as dialkylphthalate of formula (III) or alternatively a polypropylene catalyst in the series of Polytrack, commercially available from Grace.

For the production of the polypropylene random copolymers according to the invention the catalyst system used comprises in addition to the special Ziegler-Natta procatalyst (i) an organometallic cocatalyst as component (ii).

Accordingly it is preferred to select the cocatalyst from the group consisting of trialkylaluminium, like triethylaluminium (TEA), triisobutylaluminium, tri-n-butylaluminium; dialkyl aluminium chloride, like dimethyl- or diethyl aluminium chloride; and alkyl aluminium sesquichloride. More preferably the cocatalyst is triethylaluminium or diethylaluminium chloride, most preferably triethylaluminium is used as cocatalyst.

Component (iii) of the catalysts system used is an external donor represented by formula (I) or (II)

$$Si(OCH_2CH_3)_3(NR^1R^2) \qquad (I)$$

or $$Si(OCH_3)_2(CH_3)(cyclohexyl) \qquad (II)$$

wherein $R^1$ and $R^2$ can be the same or different and represent a hydrocarbon group having 1 to 12 carbon atoms.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, isopropyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same and have 1 to 6 carbon atoms, yet more preferably both $R^1$ and $R^2$ are a $C_1$-$C_4$-alkyl group.

Most preferably the external donor represented by the formula (I) is diethylaminotriethoxysilane.

Component (iii) of the catalyst system is therefore preferably diethylaminotriethoxysilane or cyclohexylmethyldimethoxysilane.

The external donor represented by the formula (I) may be produced according to the methods disclosed in EP 1538 167. The content of this document is herein included by reference.

The weight ratio of the organoaluminium compound to external donor ranges preferably between 1 and 10, more preferably between 2 and 5.

Surprisingly it has been found that by the usage of the special combination of a Ziegler-Natta procatalyst containing the above described transesterification product as internal donor, an organometallic cocatalyst and a specific external donor, polypropylene random copolymers with high melt flow and low odour and taste level can be produced directly without the need of any further processing step, like visbreaking.

Thus a further aspect of the present invention is the use of a catalyst system comprising
(i) a Ziegler-Natta procatalyst which contains a trans-esterification product of a lower alcohol and a phthalic ester as internal donor and
(ii) an organometallic cocatalyst and
(iii) external donor represented by the formula (I) or (II)

Si(OCH$_2$CH$_3$)$_3$(NR$^1$R$^2$)     (I)

or

Si(OCH$_3$)$_2$(CH$_3$)(cyclohexyl)     (II)

wherein $R^1$ and $R^2$ can be the same or different and represent a hydrocarbon group having 1 to 12 carbon atoms, for the production of polypropylene random copolymers with high melt flow, low levels of odour and taste, which are suitable for injection moulding applications, preferably thin-walled packaging.

The polymerization process for the production of the propylene-ethylene random copolymers may be a continuous process or a batch process utilising known methods and operating in liquid phase, optionally in the presence of an inert diluent, or in gas phase or by mixed liquid-gas techniques.

Accordingly, the propylene-ethylene random copolymers may be produced by single- or multistage process polymerizations of propylene and ethylene such as bulk polymerization, gas phase polymerization, slurry polymerization, solution polymerization or combinations thereof using a catalyst system as described above.

Preferably, a copolymer is made either in one or two loop reactor(s) or in a combination of one or two loop reactor(s) and one gas phase reactor. Those processes are well known to one skilled in the art.

If polymerization is performed in one or two loop reactors, the polymerization is preferably carried out in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence of the melt flow of the polypropylene, is regulated by adding hydrogen.

According to a further preferred embodiment of the present invention, the polyolefin composition is produced in a polymerization process based on a first polymerization step in at least one slurry reactor and a second polymerization step preferably comprising at least one gas phase reactor. Preferred slurry reactors are loop reactors.

Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail above, comprising the special Ziegler-Natta procatalyst, the external donor and the cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt % monomer. According to a preferred embodiment the slurry reactor comprises a bulk loop reactor.

"Gas phase reactor" (GPR) means any mechanically mixed or fluid bed reactor. Preferably the gas phase reactor comprises a mechanically agitated fluid bed reactor with gas velocities of at least 0.2 m/sec.

The particularly preferred embodiment of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315 incorporated herein by reference.

A further suitable slurry-gas phase process is the Spheripol® process of LyondellBasell.

Preferably the polypropylene random copolymers according to the invention are produced by using a special Ziegler- Natta procatalyst in combination with a special external donor, as described above in detail, in the Spheripol® or in the Borstar®PP process.

One preferred multistage process may therefore comprise the steps of:
- producing a polypropylene polymer, optionally in the presence of ethylene comonomer, and in the presence of the chosen catalyst system, as described in detail above, comprising the special Ziegler-Natta procatalyst (i), an external donor (iii) and the cocatalyst (ii) in a first slurry reactor and optionally in a second slurry reactor, both slurry reactors using the same polymerization conditions,
- transferring the slurry reactor product into a $1^{st}$ GPR
- further polymerizing in the presence of ethylene comonomer in the presence of the catalyst system in said $1^{st}$ GPR,
- recovering the polymer product for further processing.

A further preferred multistage process may therefore comprise the steps of:
- producing a polypropylene polymer, optionally in the presence of ethylene comonomer, and in the presence of the chosen catalyst system, as described in detail above, comprising the special Ziegler-Natta procatalyst (i), an external donor (iii) and the cocatalyst (ii) in a first slurry reactor and
- transferring the reactor product of the first slurry reactor in a second slurry reactor, both slurry reactors using the same polymerization conditions,
- recovering the polymer product for further processing.

One skilled in the art is aware of the various possibilities to produce polypropylene random copolymers and will simply find out a suitable procedure to produce suitable polymers which are used in the present invention.

With respect to the above-mentioned preferred slurry-gas phase process, the following general information can be provided with respect to the process conditions.

Slurry polymerization is carried out at temperatures of from 40° C. to 110° C., preferably between 50° C. and 100° C., in particular between 60° C. and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor, wherein the temperature preferably is within the range of from 50° C. to 130° C., more preferably 60° C. to 100° C., at a pressure in the range of from 5 to 50 bar, preferably 8 to 40 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.1 to 5 hours, for example 0.2 to 2 hours, while the residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

The polypropylene random copolymer produced according to one of the above described processes is separated from the reaction medium and unreacted gases, recovered as powder and optionally converted to pellets.

Furthermore, the current invention also provides the polypropylene random copolymers produced according to the above described process.

The polypropylene random copolymers produced according to the invention have an ethylene comonomer content of 2.5 to 5.0 wt %, preferably 3.0 to 4.5 wt %.

Furthermore the $MFR_2$ in accordance with ISO 1133 (230° C., 2.16 kg load) of the polypropylene random copolymers according to the invention is in the range of $\geq 25$ g/10 min to 100 g/10 min, preferably $\geq 30$ g/10 min to $\leq 95$ g/10 min.

The hexane-solubles content, determined according to FDA CFR 21 §177.1520, of the polypropylene random copolymers according to the invention is below 5 wt %, which makes the copolymers suitable for use in food packaging for non-cooking applications. Preferably the hexane-solubles content is below 4.5 wt %, more preferably below 4.2 wt %.

The xylene soluble fraction of the random copolymer according to the present invention comprises less than 8 wt % (with respect to the total random copolymer weight), advantageously between 4 and 7.5 wt %.

The propylene copolymers produced in accordance with the present invention have a molecular weight distribution in the range from 3 to 7.

Furthermore the random copolymer according to the present invention show high flowability, measured with the spiral flow test at 230° C.

The copolymers of the invention may further contain various conventional additives, such as antioxidants, UV-stabilizers, acid scavengers, antistatics, lubricants, demoulding agents, nucleating agents, clarifiers, fillers, coloring agents, etc. in an amount of 0.001 to 10 wt. %, preferably up to 5.0 wt % and more preferably up to 3.0 wt % based on the weight of the polypropylene random copolymer.

In the preferred embodiments, the additives are added to the polypropylene random copolymer. Preferably, these additives are mixed into the composition prior to or during the extrusion process in a one-step compounding process. Alternatively, a master batch may be formulated, wherein the polypropylene random copolymer is first mixed with only some of the additives.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive polypropylene random copolymers.

Polypropylene random copolymers according to the invention may be pelletized and compounded using any of the variety of compounding and blending methods well known and commonly used in the resin compounding art.

The polypropylene random copolymers of the current invention are preferably used for the production of moulded articles, preferably injection moulded articles. Even more preferred is the use for the production of thin wall packaging articles, for example for food and medical packaging.

The current invention also provides articles comprising the inventive polypropylene random copolymers. Preferably, these articles are produced by injection moulding.

Articles produced from the polypropylene random copolymers according to the invention have a tensile modulus in machine direction according to ISO 572-2 at 23° C. of $\geq 1000$ MPa.

Furthermore the articles may also be transparent with a haze value of equal to or less than 30%, preferably less than 25%, based on a thickness of 1 mm and measured on injection moulded specimens of 60×60×1 mm prepared according to EN ISO 1873-2.

In addition articles produced from the polypropylene random copolymers according to the present invention have a low level of odour and taste.

The level of odour and/or taste is measured on granules made from the article with a kind of dilution-to-threshold method, according to the German guideline for organic materials in contact with drinking water (KTW-Richtlinie, latest edition 2008, issued by the German Umweltbundesamt) by determining the flavor and odour of water which has been in contact with the polymer granules at a temperature of 70° C. for a period of 4 hours. The determination method detailed there is in turn based on DIN EN 1622: 2006 for the determination of threshold odour numbers (TON) and threshold flavour numbers (TFN).

Due to their high melt flow values the propylene polymers are especially suited for articles with a flow length to wall thickness ratio equal to or higher than 50, preferably equal to or higher than 100, more preferably equal to or higher than 200, even more preferably equal to or higher than 250, and most preferably equal to or higher than 300.

The articles into which the propylene polymers are transformed have a wall thickness in the range from 100 μm to 2 mm. Preferably the lower limit for thickness is 200 μm, more preferably it is 250 μm. Preferably the upper limit for thickness is 1.5 mm, even more preferably it is 1.0 mm.

EXAMPLES

Methods

Melt Flow Rate

Unless otherwise specified, the melt flow rate is measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

Comonomer content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}$C-NMR.

Xylene Solubles

The xylene soluble fraction (XS) as defined and described in the present invention was determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume of solvent taken (250 milliliters) and $v_1$ defines the volume of the aliquot taken for determination (analysed sample; 100 milliliters).

Molecular Weights, Molecular Weight Distribution (Mn, Mw, MWD)—GPC

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The tensile modulus was measured according to ISO 572-2 on test specimens 1B (total length 170 mm) at 1 mm/min and 23° C. Test specimens 1B as described in EN ISO 1873-2 were used.

Charpy notched impact strength (NIS), NIS was determined according to ISO 179-1 eA:2000 on V-notched samples of 80×10×4 $mm^3$ at 23° C. (Charpy notched impact strength (23° C.)). The test specimens were prepared by injection moulding using an IM V 60 TECH machinery in line with ISO 1873-2. The melt temperature was 200° C. and the mould temperature was 40° C.

Hexane-Solubles (wt %)

The content of hexane-solubles was determined according to FDA CFR 21 §177.1520. Procedure: 1 g sample of a polymer film of 100 μm thickness (produced on a PM30 cast film line using chill-roll temperature of 40° C.) was extracted at 50° C. in 400 ml n-hexane for 2 hours and then filtered on a filter paper N°41. The filtrate was then evaporated and the total residue weighed as a measure of the n-hexane extractable fraction.

Flow Properties (Spiral Flow at 230° C.)

Principles:

This method specifies a principle to test, by use of injection moulding, the flowability of a plastic material taking into consideration the cooling effect of the mould. Plastic is melted down and plasticized by a screw in a warm cylinder. Melted plastic is injected by the screw function as a piston, into a cavity with a certain speed and pressure. The cavity is shaped as a spiral with a divided scale for length measurement printed in the steel. That gives the possibility to read the flow length directly on the injection moulded test spiral specimen.

Spiral Test was carried out using an Engel ES 1050/250 HL injection molding apparatus with a spiral mould and pressure of 600, 1000 or 1400 bar screw diameter: 55 mm
spec. injection pressure: 600, 1000, or 1400 bar
tool form: round, spiral form; length 1545 mm; profile: trapeze 2.1 mm thickness; cross sectional area 20.16 $mm^2$
temperature in pre-chamber and die: 230° C.
temperature in zone 2/zone 3/zone 4/zone 5/zone 6: 230° C./230° C./220° C./220° C.
injection cycle: injection time including holding: 6 s
cooling time: 10 s
screw speed: 50 mm/sec
tool temperature: 40° C.

The spiral flow length can be determined immediately after the injection operation.

Haze as measures for the optical appearance film were determined according to ASTM D 1003-07 (haze), on injection moulded plaques of 60×60 mm with a thickness of 1 respectively 2 mm prepared according to EN ISO 1873-2.

Test Method: Qualitative Flavour and Odour Determination

The organoleptic properties of the polymers were investigated according to the German guideline for organic materials in contact with drinking water (KTW-Richtlinie, latest edition 2008, issued by the German Umweltbundesamt) by determining the flavor and odour of water which has been in contact with the polymer granules at a temperature of 70° C. for a period of 4 hours. The determination method detailed there is in turn based on DIN EN 1622: 2006 for the determination of threshold odour numbers (TON) and threshold flavour numbers (TFN).

Test water used for these tests had to be clarified with an anion/cation exchanger and an activated carbon and microbe filter. A suitable equipment is a Millipore drinking water filter. Alternatively, mineral water can be used. Samples from production were stored in closed and flavour/odourless plastic bags at the laboratory for at least 3 days before the organoleptic test began. The granules were mixed with the test water at a ratio of 32 g/1000 ml in Erlenmeyer flasks equipped with a magnetic stirrer which were closed with a glass stopper. The flasks were put in a thermostat with stirring insert set at 70±1° C. for 4 hours, then the water was decanted into a closable glass bottle and left for at least 12 hours before starting the test, in which period the water had to cool to ±0.5° C. of the ambient temperature.

A trained flavour/odour panel of 6 persons was used, the participants of which had to compare to reference water prepared in an identical way but without contact to the polymer granules with the coded samples in each pair of cups, which were diluted up to 4 times. Each participant decided if the two samples in each pair were equal or if any of the samples had an annoying flavour/odour.

Flavour in test water exists if more than 50% of the participants in a panel indicated flavour in the test water, and the degree of flavour was determined by stepwise dilution until the flavour was not recognizable any more according to the table below. Quantification of the flavour was then performed on the levels of 1, 1-1.5, 1.5-2, 2-4 and >4, the lower numbers indicating less annoying flavour and better organoleptic behaviour.

| Sample | Test water (ml) | Dilution water (ml) | Flavour/odour level |
|---|---|---|---|
| 1 | 400 | 0 | 1 |
| 2 | 260 | 140 | 1.5 |
| 3 | 200 | 200 | 2 |
| 4 | 100 | 300 | 4 |

The same quantification is performed on the same water samples for the odour.

Example 1-3

Polymerization and Polymer Properties

The polymerizations were conducted in a pilot plant loop reactor in liquid propylene. Polymerization conditions and polymer properties are given in table I. The catalyst used in the polymerization was prepared according to WO 92/19653 with DOP as dialkylphthalate of the formula (III) and ethanol as alcohol, the cocatalyst was Triethylaluminium (TEA) and as an external donor (ED) diethylaminotriethoxysilane was used. Hydrogen in appropriate concentrations was used for melt flow control.

TABLE 1

| | Unit | Example 1 | Example 2 | Example 3 |
|---|---|---|---|---|
| $TEA/C_3$ | g/kg | 0.20 | 0.20 | 0.20 |
| TEA/ED | g/g | 4 | 4 | 4 |
| T | ° C. | 65 | 65 | 65 |
| $H_2$ | ppm | 2800 | 4850 | 4500 |
| $MFR_2$ | g/10 min | 30 | 80 | 70 |
| MWD | | 4.5 | 4.3 | 4.7 |
| $C_2$ | wt % | 3.1 | 3.3 | 3.2 |
| XS | wt % | 6.1 | 6.8 | 6.7 |

Example 4 and 5, Comparative Example CE1 and CE2

The polymerizations were conducted in a Spheripol® plant comprising one prepolymerization reactor and two loop reactors connected in series. The catalyst used in the polymerization was prepared according to WO 92/19653 with DOP as dialkylphthalate of the formula (III) and ethanol as alcohol, the cocatalyst was Triethylaluminium (TEA) and as an external donor (ED) cyclohexylmethyldimethoxysilane was used. Hydrogen in appropriate concentrations was used for melt flow control.

Polymerization conditions and polymer properties are given in table 2.

TABLE 2

| | EXAMPLE 4 | EXAMPLE 5 | CE 1 | CE 2 |
|---|---|---|---|---|
| 1) Prepolymerization | | | | |
| T [° C.] | 28 | 28 | 28 | 28 |
| TEA/ED [g/g] | 4 | 4 | 4 | 4 |
| $ED/C_3$ [g/t] | 40 | 40 | 40 | 40 |
| $TEA/C_3$ [g/t] | 160 | 160 | 160 | 160 |
| $C_3$-feed [kg/h] | 2900 | 2900 | 2900 | 2900 |
| 2) $1^{st}$ Loop-reactor | | | | |
| T [° C.] | 68 | 68 | 68 | 68 |
| Pressure [bar] | 36.5 | 36.5 | 36.5 | 36.5 |
| $H_2$ [ppm] | 2100 | 2675 | 1200 | 1200 |
| $C_3$-feed [t/h] | 33 | 33 | 39 | 39 |
| $C_2$-feed [kg/h] | 500 | 500 | 600 | 600 |
| 3) $2^{nd}$ Loop-reactor | | | | |
| T [° C.] | 68 | 68 | 68 | 68 |
| Pressure [bar] | 36.5 | 36.5 | 36.5 | 36.5 |
| $H_2$ [ppm] | 2100 | 2675 | 1200 | 1200 |
| $C_3$-feed [t/h] | 13 | 13 | 17 | 17 |
| $C_2$-feed [kg/h] | 300 | 300 | 305 | 305 |
| Split $1^{st}$ loop:$2^{nd}$ loop | 50:50 | 50:50 | 50:50 | 50:50 |
| Polymer properties | | | | |
| $C_2$ [wt %] | 3.9 | 3.9 | 3.9 | 3.9 |
| $MFR_2$[g/10 min] | 33 | 48 | 14 | 13 |
| XS [wt %] | 6.9 | 7.2 | 6.9 | 7.0 |
| MWD | 4.1 | 4.6 | 4.1 | 3.3 |

The base resins of Comparative Examples CE1 and CE2 were subjected to peroxidic degradation (visbreaking) at 220° C. with 2,5-dimethyle-2,5-di(tert-butylperoxy)hexane (DHBP, from Degussa). The MFR was increased up to 30 g/10 min for CE1 and up to 45 g/10 min for CE2.

Testing of Resins:

Base resins 1-5 and Comparative base resins (after visbreaking) CE1 and CE2 were obtained in powder form.

The Base resins and Comparative resins were mixed with 330 ppm Irganox1010 (Ciba Speciality Chemicals, antioxidant), 670 ppm Irgafos 168 (Ciba Speciality Chemicals, stabilizer), 900 ppm Ca-stearate (Faci, acid scavenger), 1400 ppm Grinsted PS426 (Danisco, antistatic) and with Millad 3988 (Example 1: 1960 ppm; Example 2: 1770 ppm; Example 3: 1760 ppm; Example 4 and 5: 1700 ppm; CE1 and CE2: 1700 ppm; Milliken, clarifier)

The mixtures were compounded by feeding the components to a Prism 24twin-screw extruder (Prism Ltd., Staffordshire, UK) operating in a melt temperature range of 190° C.-220° C. The material was then extruded through a strand die, cooled in a water bath and chopped to form pellets.

TABLE 3

Properties of compounded resins 1-5 and CE1 and CE2:

| | Unit | Ex. 1 | Ex. 2 | Ex. 3 | Ex. 4 | Ex. 5 | CE1 | CE2 |
|---|---|---|---|---|---|---|---|---|
| Tensile modulus | MPa | 1320 | 1313 | 1071 | 1040 | 1060 | 1019 | 1010 |
| Charpy 23° C. | kJ/m$^2$ | 4 | 2.9 | 2.9 | 7.4 | 6.4 | 7.6 | 7.0 |
| Flow length, 600 MPa | mm | 950 | 1525 | 1488 | 1246 | 1436 | 1024 | 1133 |
| Flow length, 1000 MPa | mm | Full | Full | Full | Full | Full | Full | Full |
| Haze 1 mm | % | 20.5 | 25.7 | 25.7 | 9.4 | 9.9 | 9.3 | 9.6 |
| Haze 2 mm | % | 56.9 | 70 | 62.4 | 22.5 | 25.1 | 23.8 | 24.0 |
| Odour level | | 1.5-2 | 1.5-2 | 1.5-2 | <1 | <1 | >4 | >4 |
| Taste level | | 1.5-2 | 1.5-2 | 1-1.5 | <1 | <1 | >4 | 2-4 |
| HS | wt % | 2.9 | 3.3 | 3.0 | 3.8 | 4.0 | 3.7 | 3.2 |

HS...n-hexane soluble
Full....1545 mm

We claim:

1. Process for the production of polypropylene random copolymers with a low level of odour and taste containing 2.5 to 5.0 wt % of ethylene as comonomer and having an MFR$_2$ in accordance with ISO 1133 (230° C., 2.16 kg load) of ≥25 g/10 min to 100 g/10 min and a hexane-solubles content, determined according to FDA CFR 21 §177.1520 below 5 wt %, said process comprising the step of polymerizing propylene and ethylene in the presence of a catalyst system comprising (i) a Ziegler-Natta procatalyst which contains a trans-esterification product of a lower alcohol and a phthalic ester as internal donor and (ii) an organometallic cocatalyst and (iii) an external donor represented by formula (I)

Si(OCH$_2$CH$_3$)$_3$(NR$^1$R$^2$)  (I)

wherein R$^1$ and R$^2$ can be the same or different and represent a hydrocarbon group having 1 to 12 carbon atoms, wherein the polypropylene random copolymer has a xylene soluble fraction of less than 8 wt %.

2. Process according to claim 1 wherein the procatalyst (i) used has been prepared by a) reacting a spray crystallized or emulsion solidified adduct of MgCl$_2$ and a C$_1$-C$_2$-alcohol with TiCl$_4$ b) reacting the product of stage a) with a dialkylphthalate of formula (III)

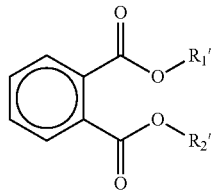

wherein R$_1$' and R$_2$' are independently at least a C$_5$-alkyl under conditions where a transesterification between said C$_1$-C$_2$-alcohol and said dialkylphthalate of formula (III) takes place to form the internal donor c) washing the product of stage b) and d) optionally reacting the product of step c) with TiCl$_4$.

3. Process according to claim 2, wherein the dialkylphthalate of formula (III) is dioctylphthalate and that the C$_1$-C$_2$-alcohol is ethanol.

4. Process according to claim 1, wherein the Ziegler-Natta procatalyst (i) is used in the presence of an organometallic cocatalyst (ii) selected from the group consisting of trialkylaluminium, dialkyl aluminium chloride and alkyl aluminium sesquichloride.

5. Process according to claim 4, wherein the cocatalyst is triethylaluminium.

6. Process according to claim 1, wherein the polypropylene random copolymer is produced in one or two slurry reactors or in a combination of one or two slurry reactor(s) and one or two gas phase reactor(s).

* * * * *

UNITED STATES PATENT AND TRADEMARK OFFICE
CERTIFICATE OF CORRECTION

PATENT NO. : 8,822,021 B2
APPLICATION NO. : 13/138489
DATED : September 2, 2014
INVENTOR(S) : Christelle Grein et al.

It is certified that error appears in the above-identified patent and that said Letters Patent is hereby corrected as shown below:

In The Specification

Column 12,
Line 49, add --/200°C-- between "220°C" and "."

Signed and Sealed this
Twelfth Day of May, 2015

Michelle K. Lee
*Director of the United States Patent and Trademark Office*